(12) United States Patent
Dunn

(10) Patent No.: US 9,456,559 B2
(45) Date of Patent: Oct. 4, 2016

(54) AIRBORNE VEGETATION TRIMMING APPARATUS

(71) Applicant: T Scott Dunn, Phoenix, OR (US)

(72) Inventor: T Scott Dunn, Phoenix, OR (US)

( * ) Notice: Subject to any disclaimer, the term of this patent is extended or adjusted under 35 U.S.C. 154(b) by 922 days.

(21) Appl. No.: 13/752,280

(22) Filed: Jan. 28, 2013

(65) Prior Publication Data

US 2014/0209210 A1    Jul. 31, 2014

(51) Int. Cl.
*A01G 23/095* (2006.01)

(52) U.S. Cl.
CPC .................. *A01G 23/095* (2013.01)

(58) Field of Classification Search
CPC .. A01G 23/08; A01G 23/091; A01G 3/0408; A01G 3/0426; A01G 3/0435; A01G 3/085; A01G 3/088; A01G 23/095
USPC ...................................................... 244/137.4
See application file for complete search history.

(56) References Cited

U.S. PATENT DOCUMENTS

| | | |
|---|---|---|
| 3,266,633 A | 8/1966 | Graebner |
| 3,566,526 A | 3/1971 | La Violette |
| 3,746,177 A | 7/1973 | Vilotti |
| 4,554,781 A * | 11/1985 | Rogers ................. B23D 45/105 56/11.9 |
| 4,815,263 A * | 3/1989 | Hartung ............... A01G 23/095 144/24.13 |
| 4,936,038 A | 6/1990 | Johnson et al. |
| D346,950 S | 5/1994 | Dunn et al. |
| D359,441 S | 6/1995 | Miller |
| 5,937,559 A | 8/1999 | Jennen |
| D449,977 S | 11/2001 | Dembowiak et al. |
| 6,408,906 B1 * | 6/2002 | Moon .................. A01G 23/091 144/24.13 |
| 6,425,560 B1 | 7/2002 | Dembowiak et al. |
| 6,491,271 B1 | 12/2002 | Adams |
| 6,793,184 B2 | 9/2004 | Dougal et al. |
| 7,963,406 B2 | 6/2011 | Kinsella |
| 2003/0159757 A1 | 8/2003 | Tingstad |
| 2008/0105332 A1 * | 5/2008 | Lippits ................. A01G 23/095 144/24.13 |

FOREIGN PATENT DOCUMENTS

WO    WO2004103063    12/2004

* cited by examiner

*Primary Examiner* — Matthew G Katcoff
(74) *Attorney, Agent, or Firm* — Jerry Haynes Law

(57) ABSTRACT

An airborne vegetation trimming apparatus includes an apparatus housing, an elongated saw boom extending from the apparatus housing, a plurality of rotatable saw blades carried by the saw boom, a saw blade operating system drivingly engaging the saw blades, a rotatable tubing coupling carried by the apparatus housing and a tubing coupling rotation motor drivingly engaging the tubing coupling.

20 Claims, 4 Drawing Sheets

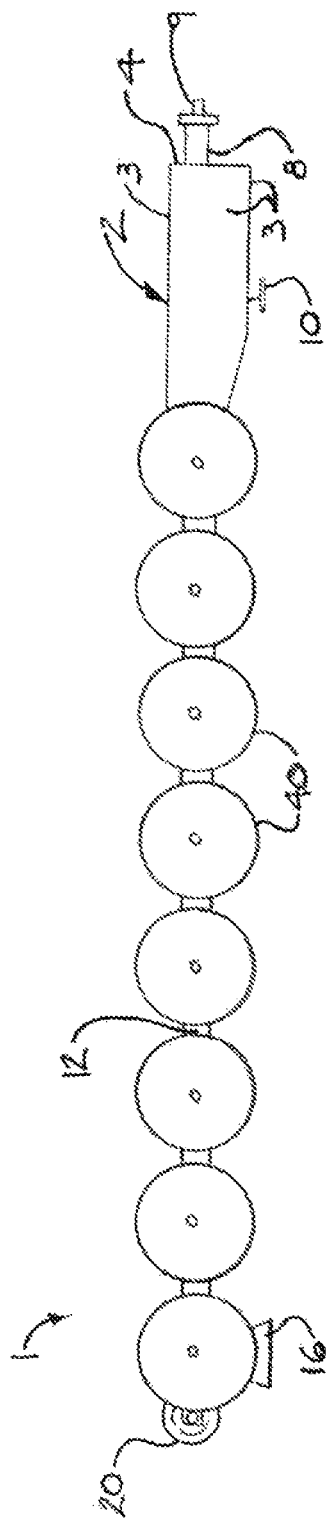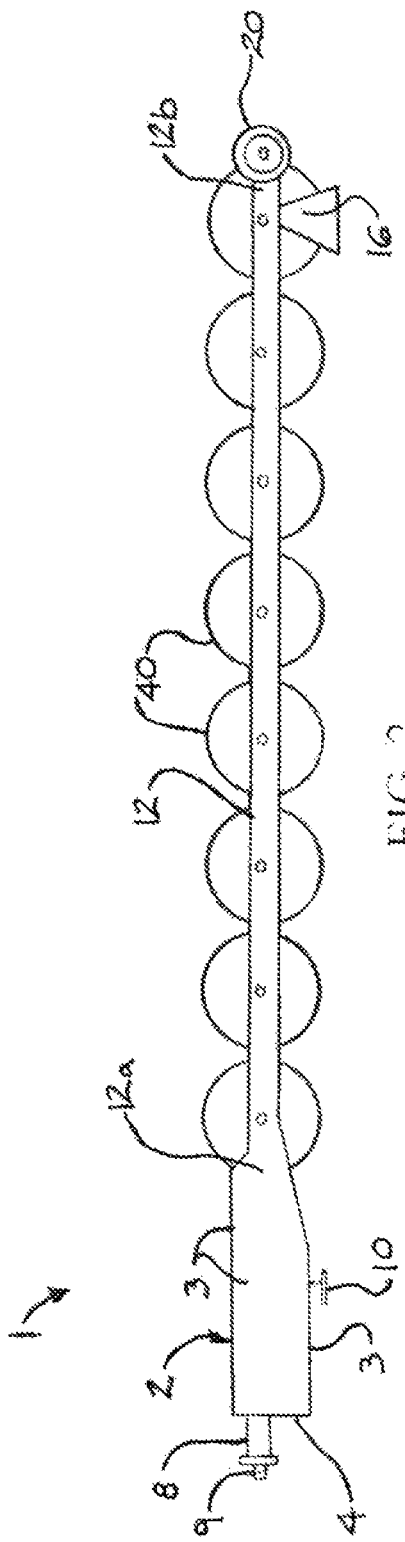

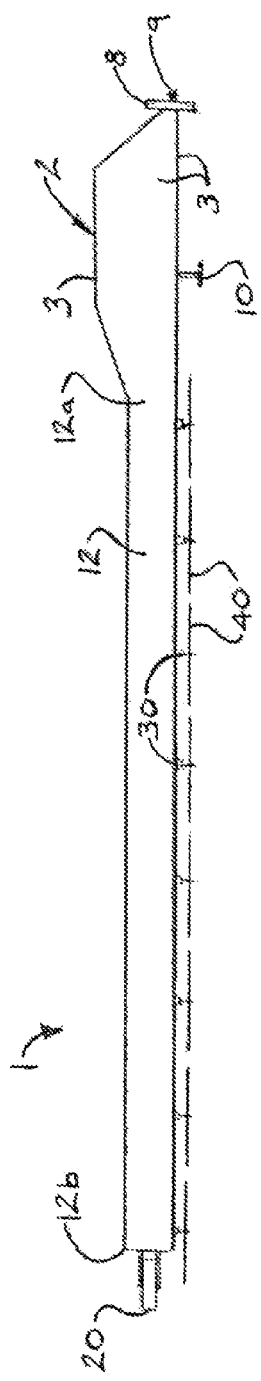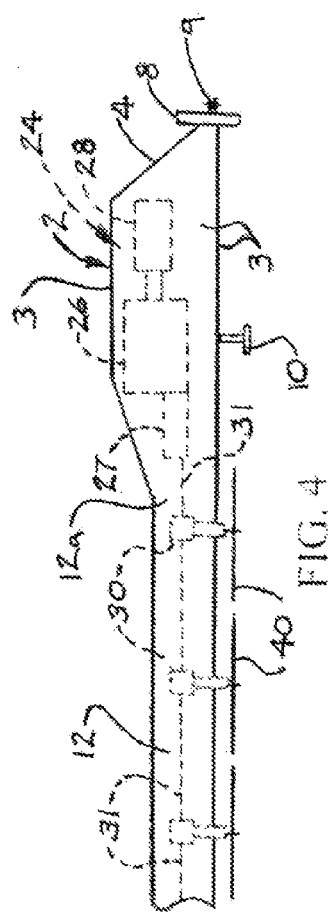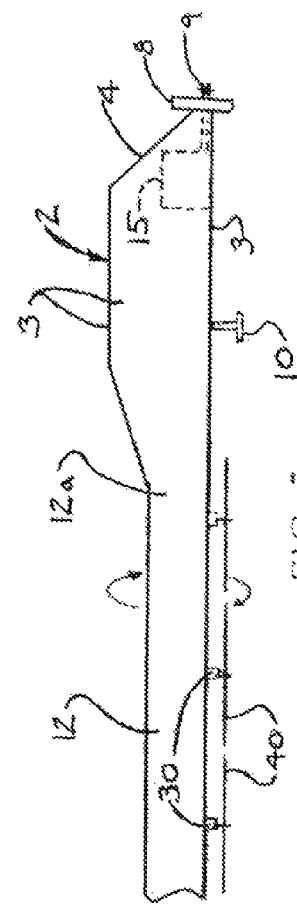

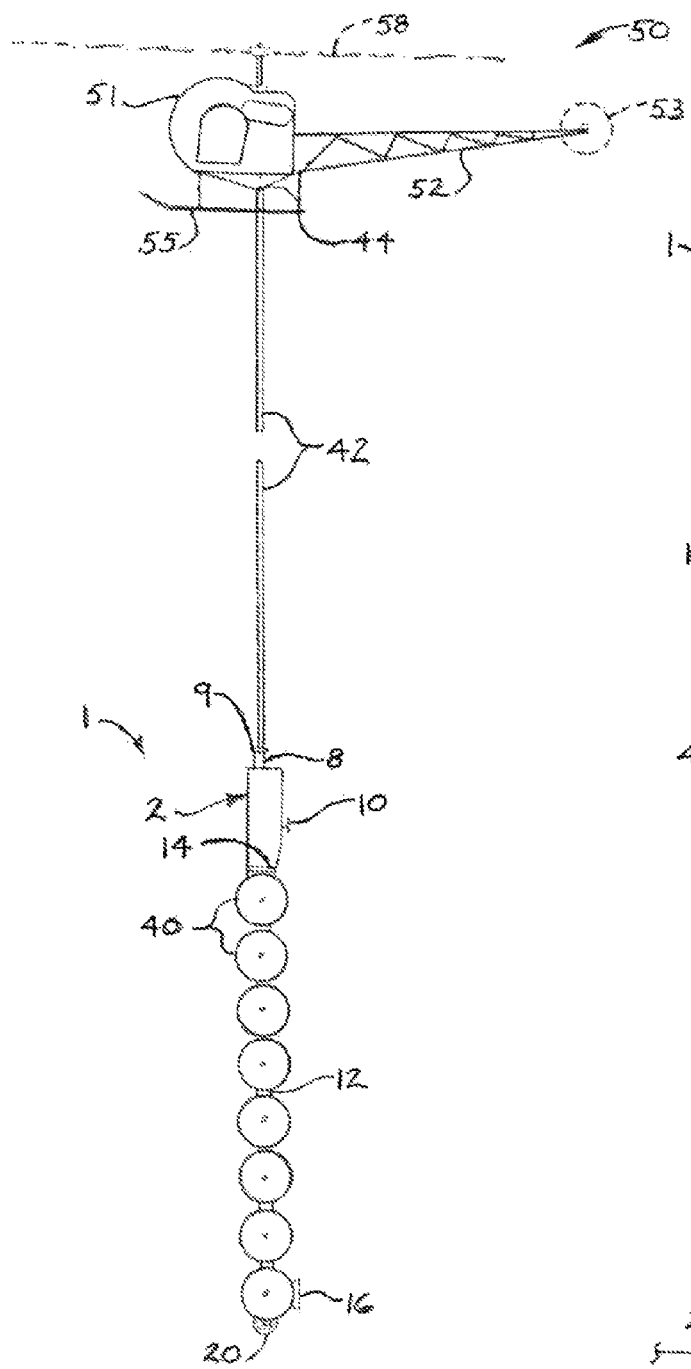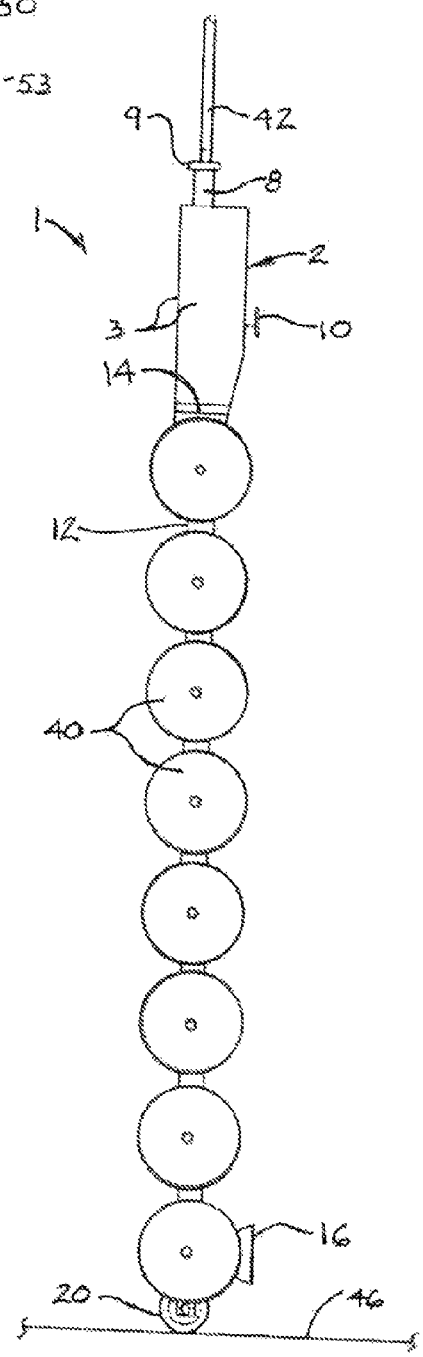
FIG. 7
FIG. 8

AIRBORNE VEGETATION TRIMMING APPARATUS

FIELD OF THE INVENTION

Illustrative embodiments of the disclosure generally relate to apparatuses for trimming vegetation. More particularly, illustrative embodiments of the disclosure relate to an airborne vegetation trimming apparatus which can be suspended from a flying helicopter to trim a right-of-way for electric power lines or the like through a cluster of trees, brush and/or other vegetation.

BACKGROUND OF THE INVENTION

In the transmission of utility power lines, it is often necessary to route the power lines over areas of land covered with trees, thick brush and/or other vegetation. Therefore, rights-of-way are often cut through vegetation and then maintained to accommodate the power lines using ground- or air-applied herbicides. This method, however, may be undesirable particularly during windy weather since the herbicides may be blown from the rights-of-way onto adjacent crops and animals. Alternative methods which involve the use of ground-supported cutting equipment and personnel to cut and maintain the rights-of-way may be expensive, laborious and time-consuming.

Accordingly, an airborne tree trimming apparatus which can be suspended from a flying helicopter to trim a right-of-way for electric power lines or the like through vegetation may be desirable for some applications.

SUMMARY OF THE INVENTION

Illustrative embodiments of the disclosure are generally directed to an airborne vegetation trimming apparatus which can be suspended from a flying helicopter to trim a right-of-way for electric power lines or the like through vegetation. An illustrative embodiment of the airborne vegetation trimming apparatus includes an apparatus housing, an elongated saw boom extending from the apparatus housing, a plurality of rotatable saw blades carried by the saw boom, a saw blade operating system drivingly engaging the saw blades, a rotatable tubing coupling carried by the apparatus housing and a tubing coupling rotation motor drivingly engaging the tubing coupling.

BRIEF DESCRIPTION OF THE DRAWINGS

Illustrative embodiments of the disclosure will now be described, by way of example, with reference to the accompanying drawings, in which:

FIG. 1 is a front view of an illustrative embodiment of the airborne vegetation trimming apparatus;

FIG. 2 is a rear view of an illustrative embodiment of the airborne vegetation trimming apparatus;

FIG. 3 is a side view of an illustrative embodiment of the airborne vegetation trimming apparatus;

FIG. 4 is a side view, partially in section, of an illustrative embodiment of the airborne vegetation trimming apparatus, more particularly illustrating a hydraulic reservoir, an engine, a hydraulic pump and multiple hydraulic blade drive motors (illustrated in phantom) in the apparatus;

FIG. 5 is a side view, partially in section, of an illustrative embodiment of the airborne vegetation trimming apparatus, more particularly illustrating a tubing coupling rotation motor engaging a tubing coupling for selective rotation of the tubing coupling relative to the apparatus housing;

FIG. 7 is a side view of an illustrative embodiment of the airborne vegetation trimming apparatus suspended from a flying helicopter in exemplary operation of the apparatus; and FIG. 8 is a side view of an illustrative embodiment of the airborne vegetation trimming apparatus suspended from a flying helicopter (not illustrated) and supported by the ground.

DETAILED DESCRIPTION

Figure 6:
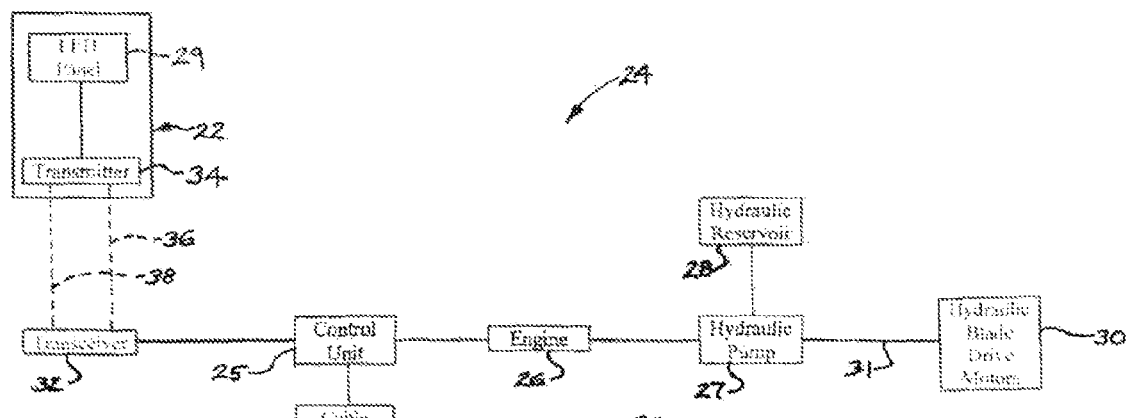
FIG. 6 is a block diagram of an apparatus operating system according to an illustrative embodiment of the airborne vegetation trimming apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring initially to FIGS. 1-6A of the drawings, an illustrative embodiment of the airborne vegetation trimming apparatus, hereinafter apparatus, is generally indicated by reference numeral 1. The apparatus 1 includes an apparatus housing 2. The apparatus housing 2 may be generally elongated with multiple housing side panels 3 and a housing end panel 4. At least one housing foot 10 may extend from one or more of the housing side panels 3 of the apparatus housing 2 to support the apparatus housing 2 in a horizontal position on a supporting surface (not illustrated) when the apparatus 1 is not in use.

A coupling stanchion 8 having a tubing coupling 9 may be provided on the housing end panel 4 or in any other suitable location on the apparatus housing 2. The tubing coupling 9 may be capable of 360-degree rotation with respect to the apparatus housing 2. As illustrated in FIG. 5, a tubing coupling rotation motor 15 may drivingly engage the tubing coupling 9 to facilitate selective rotation of the tubing coupling 9. In operation of the apparatus 1, which will be hereinafter described, a suspension tubing 42 (FIG. 7) is attached to the tubing coupling 9 to facilitate suspension of the apparatus 1 from a flying helicopter 50. The tubing coupling rotation motor 15 can be operated to rotate the tubing coupling 9 with respect to the apparatus housing 2 and facilitate selective 360-degree rotation of the apparatus 1 about a vertical axis to facilitate multi-positioning capability of the saw blades 40 during the cutting or trimming of vegetation, as will be hereinafter further described. The suspension tubing 42 may be various lengths depending on the particular application of the airborne vegetation trimming apparatus 1.

An elongated saw boom 12 extends from the apparatus housing 2. As illustrated in FIG. 2, the saw boom 12 may have a proximal boom end 12a at the apparatus housing 2 and a distal boom end 12b opposite the proximal boom end 12a. At least one boom foot 16 may be provided on the saw boom 12 to support the saw boom 12 in a horizontal position on a supporting surface (not illustrated) when the apparatus 1 is not in use. At least one apparatus support wheel 20 may terminate the distal boom end 12b of the saw boom 12 for purposes which will be hereinafter described.

As illustrated in FIGS. 1 and 2, multiple circular, serrated-edged saw blades 40 are provided in adjacent relationship to each other along the saw boom 12. A saw blade operating system 24, which will be hereinafter described, drivingly engages the saw blades 40 for rotation of the saw blades 40 on the saw boom 12. In some embodiments, each saw blade 40 may have a diameter of 30 inches and may be 8 in number along the saw boom 12.

As illustrated in FIGS. 4 and 6, an exemplary saw blade operating system 24 for driving the saw blades 40 includes multiple hydraulic blade drive motors 30 which drivingly engage the respective saw blades 40 for rotation according to the knowledge of those skilled in the art. A hydraulic pump 27 is disposed in fluid communication with the hydraulic blade drive motors 30 through hydraulic conduits 31. A hydraulic reservoir 28 is disposed in fluid communication with the hydraulic pump 27 and contains a supply of hydraulic fluid (not illustrated). An engine 26 drivingly engages the hydraulic pump 27. As illustrated in FIG. 6, a control unit 25 interfaces with the engine 26. The tubing coupling rotation motor 15 may interface with the control unit 25. A transceiver 32 interfaces with the control unit 25. A remote control unit 22 includes a transmitter 34 which is adapted to emit an RF control signal 36 which activates the transceiver 32. The remote control unit 22 may additionally be adapted to receive an RF feedback signal 38 which indicates the operating parameters of the engine 26.

Figure 6A:
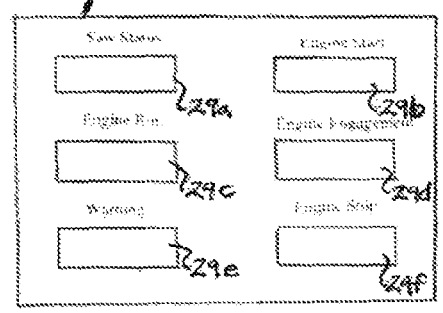
FIG. 6A is a front view of an exemplary LED panel for a remote control unit of the apparatus.

The remote control unit 22 of the saw blade operating system 24 may include control features (not illustrated) which facilitate operation of the engine 26 and the tubing coupling rotation motor 15. The control features for the engine 26 may include features which control the operational speed of the engine 26 and thus, the rotational speed of the saw blades 40. The control unit 25 may be programmed to monitor the operational status and parameters of the engine 26. Under direction of the control unit 25, the transceiver 32 may be adapted to transmit an RF feedback signal 38 which indicates the operational status and parameters of the engine 26 to the transmitter 34. An LED panel 29 on the remote control unit 22 may interface with the transmitter 34. As illustrated in FIG. 6A, the LED panel 29 may include various LEDs which indicate the operational status of the engine 26 as indicated by the feedback signal 38 from the transceiver 32. In some embodiments, these LEDs may include a Saw Status LED 29a, an Engine Start LED 29b, an Engine Run LED 29c, an Engine Engagement LED 29d, a Warning LED 29e and an Engine Stop LED 29f, for example and without limitation. The LED panel 29 may additionally include various LEDs (not illustrated) which indicate the operational status of the tubing coupling rotation motor 15 (such as ON/OFF and rotational speed and direction, for example and without limitation).

Referring next to FIGS. 7 and 8 of the drawings, in exemplary application, the apparatus 1 is suspended from an airborne helicopter 50 and the saw blades 40 are rotated to cut, trim or maintain a right-of-way for electric power lines or the like (not illustrated) through a cluster of trees, brush and/or other vegetation. The helicopter 50 may be conventional and generally includes a cabin 51, a fuselage 52 extending from the cabin 51, a rear rotor 53 on the fuselage 52 and a main rotor 58 on the cabin 51. The fuselage 52 may be fitted with a pair of runners 55.

The apparatus 1 is initially placed in a horizontal position on a support surface (not illustrated). The apparatus 1 may be supported on the support surface by the housing feet 10 on the apparatus housing 2 and the boom foot 16 on the saw boom 12. The helicopter 50 is placed on the support surface at the tubing coupling 9 end of the apparatus housing 2. A first end of the suspension tubing 42 is attached to the tubing coupling 9 on the apparatus housing 2. A second end of the suspension tubing 42 is attached to the tubing coupling 44 on the helicopter 50. The helicopter 50 is then operated to lift the apparatus 1 from the support surface until the apparatus 1 is suspended off the ground in a vertical orientation beneath the helicopter 50, as illustrated in FIG. 7. The helicopter 50 is then flown to the location of the vegetation through which the right-of-way will be cut as the apparatus 1 is suspended and carried beneath the helicopter 50.

The saw blade operating system 24 may be controlled by an operator (not illustrated) of the apparatus 1 who in some applications may sit in the cabin 51 of the helicopter 50. Alternatively, the operator of the apparatus 1 may be located on the ground in the vicinity of the area in which the right-of-way is to be cut through the vegetation. The operator accesses the remote control unit 22 and manipulates the controls (not illustrated) for the transmitter 34, which transmits an RF control signal 36 to the transceiver 32. The control unit 25 receives control signals from the transceiver 32 and operates the engine 26, which drives the hydraulic pump 27. The hydraulic pump 27 pumps hydraulic fluid from the hydraulic reservoir 28 through the hydraulic blade drive motors 30, which rotate the respective saw blades 40 on the saw boom 12. The controls on the remote control unit 22 may be used to select the operational speed of the engine 26 and thus, the rotational speed of the saw blades 40. In exemplary application, the saw blades 40 may be rotated at a speed of about 1600~1700 rpm.

As the saw blades 40 continue to rotate, the flight path of the helicopter 50 is selected such that the apparatus 1 is directed along a path that corresponds to the desired location and trajectory of the right-of-way through the cluster of trees, brush and/or other vegetation. Accordingly, the saw blades 40 cut the vegetation along the path which corresponds to the right-of-way. The apparatus 1 may be directed in multiple passes through the path of the right-of-way until the right-of-way is formed through the vegetation and substantially unobstructed by tree limbs, brush, vines, branches and/or other vegetation. After a ground crew typically clears the cut or trimmed vegetation out of the right-of-way, the electric utility power lines are routed through the right-of-way. The vegetation may be periodically cut or trimmed in a similar manner in order to eliminate encroachment of growing vegetation into the right-of-way to maintain a clear path for the utility power lines through the vegetation.

As illustrated in FIG. 8, in some applications of the apparatus 1 it may be necessary or desirable to support the apparatus 1 in a vertical orientation on the ground 46 during operation of the apparatus 1 or for repair or maintenance purposes as the apparatus 1 remains suspended from the hovering helicopter 50. Accordingly, the apparatus support wheel 20 rests on and supports the vertical apparatus 1 on the ground 46. In some applications, the helicopter 50 can be flown forwardly or rearwardly as the apparatus support wheel 20 rolls in either direction along the ground 46 and the saw blades 40 are simultaneously operated to cut the vegetation.

It will be appreciated by those skilled in the art that the rotational position of the saw blades 40 about a vertical axis can be selected by the operator of the apparatus 1 by operation of the tubing coupling rotation motor 15. Accordingly, the tubing coupling rotation motor 15 rotates the tubing coupling 9 such that the apparatus housing 2 and the saw boom 12 rotate about the vertical axis. Therefore, the saw blades 40 are positional to cut the vegetation at any and all angles relative to a vertical plane depending on the required path or trajectory of the right-of-way through the vegetation. Moreover, the control panel 25 may continually monitor the operational status and parameters of the engine 26 and transmit these parameters to the transmitter 34 via the transceiver 32 and the feedback signal 38. The operational status and parameters of the engine 26 may be indicated to the operator of the apparatus via the Saw Status LED 29*a*, the Engine Start LED 29*b*, the Engine Run LED 29*c*, an Engine Engagement LED 29*d*, the Warning LED 29*e* and the Engine Stop LED 29*f*.

While illustrative embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. An airborne vegetation trimming apparatus, comprising:
   a helicopter;
   an apparatus housing;
   an elongated saw boom extending from the apparatus housing, the saw boom having a longitudinal axis;
   a plurality of rotatable saw blades carried by the saw boom;
   a saw blade operating system drivingly engaging the saw blades;
   a rotatable tubing coupling carried by the apparatus housing; and
   a tubing coupling rotation motor drivingly engaging the tubing couplings the tubing coupling rotation motor configured to rotate the tubing coupling with respect to the apparatus housing and facilitate 360-degree rotation of the apparatus housing and the saw boom about a vertical axis parallel to the longitudinal axis of the saw boom.

2. The apparatus of claim 1 further comprising a remote control unit adapted to facilitate remote control of the saw blade operating system.

3. The apparatus of claim 2 further comprising an LED panel on the remote control unit and a plurality of LEDs on the LED panel, the LEDs adapted to indicate control statuses of the saw blade operating system.

4. The apparatus of claim 1 further comprising at least one housing foot carried by the apparatus housing.

5. The apparatus of claim 1 further comprising at least one boom foot carried by the saw boom.

6. The apparatus of claim 1 further comprising at least one apparatus support wheel carried by the saw boom.

7. The apparatus of claim 1 wherein the apparatus housing comprises a plurality of housing side panels and a housing end panel carried by the housing side panels.

8. The apparatus of claim 7 wherein the tubing coupling is carried by the housing end panel.

9. An airborne vegetation trimming apparatus, comprising:
   a helicopter;
   an apparatus housing;
   an elongated saw boom extending from the apparatus housing, the saw boom having a longitudinal axis:
   a plurality of rotatable saw blades carried by the saw boom; a saw blade operating system drivingly engaging the saw blades, the saw blade operating system including:
   a plurality of hydraulic blade drive motors drivingly engaging the saw blades, respectively;
   a hydraulic pump disposed in fluid communication with the hydraulic blade drive motors;
   a hydraulic reservoir disposed in fluid communication with the hydraulic pump; and
   an engine drivingly engaging the hydraulic pump;
   a rotatable tubing coupling carried by the apparatus housing; and
   a tubing coupling rotation motor drivingly engaging the tubing couplings the tubing coupling rotation motor configured to rotate the tubing coupling with respect to the apparatus housing and facilitate 360-degree rotation of the apparatus housing and the saw boom about a vertical axis parallel to the longitudinal axis of the saw boom.

10. The apparatus of claim 9 further comprising a remote control unit adapted to facilitate emote control of the saw blade operating system.

11. The apparatus of claim 10 further comprising an LED panel on the remote control unit and a plurality of LEDs on the LED panel, the LEDs adapted to indicate control statuses of the saw blade operating system.

12. The apparatus of claim 9 further comprising at least one housing foot carried by the apparatus housing.

13. The apparatus of claim 9 further comprising at least one boom foot carried by the saw boom.

14. The apparatus of claim 9 further comprising at least one apparatus support wheel carried by the saw boom.

15. The apparatus of claim 9 wherein the apparatus housing comprises a plurality of housing side panels and a housing end panel carried by the housing side panels.

16. The apparatus of claim 15 wherein the tubing coupling is carried by the housing end panel.

17. An airborne vegetation trimming apparatus, comprising:
   a helicopter;
   an apparatus housing;
   an elongated saw boom extending from the apparatus housing, the saw boom having a proximal boom end at the apparatus housing and a distal boom end opposite the proximal boom end, the saw boom having a longitudinal axis:
   a plurality of rotatable saw blades carried by the saw boom in adjacent, spaced-apart relationship to each other between the proximal boom end and the distal boom end;
   saw blade operating system drivingly engaging the saw blades, the saw blade operating system including:
   a plurality of hydraulic blade drive motors inside the saw boom and drivingly engaging the saw blades, respectively;
   a hydraulic pump inside the apparatus housing and disposed in fluid communication with the hydraulic blade drive motors;

a hydraulic reservoir inside the apparatus housing and disposed in fluid communication with the hydraulic pump; and an engine inside the apparatus housing and drivingly engaging the hydraulic pump;

a rotatable tubing coupling carried by the apparatus housing;

a tubing coupling rotation motor drivingly engaging the tubing couplings the tubing coupling rotation motor configured to rotate the tubing coupling with respect to the apparatus housing and facilitate 360-degree rotation of the apparatus housing and the saw boom about a vertical axis parallel to the longitudinal axis of the saw boom; and at least one apparatus support wheel carried by the distal boom end of the saw boom.

18. The apparatus of claim 17 further comprising a control unit interfacing with the engine, a transceiver interfacing with the control unit and a remote control unit having a transmitter adapted to transmit a control signal to the transceiver, the remote control unit adapted to facilitate control of the engine of the saw blade operating system by remote control.

19. The apparatus of claim 18 further comprising an LED panel on the remote control unit and a plurality of LEDs on the LED panel, the LEDs adapted to indicate control statuses of the engine of the saw blade operating system.

20. The apparatus of claim 17 further comprising at least one housing foot carried by the apparatus housing and at least one boom foot carried by the saw boom.

* * * * *